(12) United States Patent
Grau et al.

(10) Patent No.: US 7,081,616 B2
(45) Date of Patent: Jul. 25, 2006

(54) DOWNHOLE GAMMA-RAY DETECTION

(75) Inventors: Jim Grau, Ridgefield, CT (US);
Christian Stoller, Kingwood, TX (US);
Ronald Plasek, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 158 days.

(21) Appl. No.: 10/734,727

(22) Filed: Dec. 12, 2003

(65) Prior Publication Data
US 2005/0127282 A1    Jun. 16, 2005

(51) Int. Cl.
*G01V 5/04*    (2006.01)
(52) U.S. Cl. .................. 250/262; 250/256; 250/253; 250/370.09
(58) Field of Classification Search ........... 250/262, 250/253, 370.09, 256
See application file for complete search history.

(56) References Cited

U.S. PATENT DOCUMENTS

| | | | | |
|---|---|---|---|---|
| 3,767,921 A | * | 10/1973 | Jones | 250/261 |
| 4,300,043 A | | 11/1981 | Robbins | |
| 4,918,314 A | | 4/1990 | Sonne | |
| 5,340,975 A | | 8/1994 | Vogelgesang | 250/205 |
| 5,397,893 A | * | 3/1995 | Minette | 250/254 |
| 5,459,314 A | | 10/1995 | Plasek | 250/269.7 |
| 6,666,285 B1 | * | 12/2003 | Jones et al. | 175/50 |

FOREIGN PATENT DOCUMENTS

| | | |
|---|---|---|
| CN | 1045186 | 9/1990 |
| EP | 0 224 351 | 6/1987 |
| EP | 0640848 | 6/1998 |
| EP | 0 942 296 | 9/1999 |
| GB | 1 449 289 | 9/1976 |
| WO | WO92/01818 | 2/1992 |

* cited by examiner

Primary Examiner—Renee Luebke
Assistant Examiner—Mary Zettl
(74) Attorney, Agent, or Firm—Victor H. Segura; Brigitte L. Echols (57) ABSTRACT

A method for evaluating a natural gamma-ray activity within a borehole, comprises the steps of:
  stabilizing the gain according to a method for stabilizing a gain of a gamma-ray detector for use in a downhole logging tool;
  determining an interval count rate, the interval count rate corresponding to gamma-rays having an energy within a predetermined correction interval;
  calculating a correction count rate from the determined interval count rate; and
  using the correction count rate to evaluate the natural gamma-ray activity.
The method for stabilizing the gain of the gamma-ray detector for use in the downhole logging tool, comprises the steps of:
  processing a backscatter peak of a full gamma spectrum such that the backscatter peak constitutes a reference peak;
  determining a first rate, the first rate corresponding to gamma-rays having an energy within a first predetermined energy interval;
  determining a second rate, the second rate corresponding to gamma-rays having an energy within a second predetermined energy interval; and
  the first predetermined energy interval and the second predetermined energy interval straddle the backscatter peak.

25 Claims, 10 Drawing Sheets

DOWNHOLE GAMMA-RAY DETECTION

BACKGROUND OF INVENTION

1. Field of the Invention

The invention relates generally to gamma-ray logging in a borehole.

2. Background Art

Measuring gamma-rays with a detector located within a borehole is a common operation in well logging.

Natural gamma-rays are emitted in a decay of subsurface materials such as thorium, uranium and potassium (Th, U, K), each of which emits a characteristic spectrum resulting from an emission of gamma-rays at various energies. The measuring of the natural gamma-rays is particularly useful in the exploration for exploitation of oil and gas resources because it is believed that the concentrations of Th, U, K taken individually or in combination are a good indication of previously unavailable information as to the presence, type and volume of shale or clay in the formations surrounding the borehole.

A detector in a spectral mode, i.e. a detector that is sensitive to the energy of the gamma-rays, may provide a gamma-ray spectrum as a function of energy.

Alternatively, the gamma-rays may be counted without any energy discrimination: such a raw counting mode provides useful information about a presence of shale.

Furthermore, a gamma-ray detector may also detect neutron-induced gamma-rays. Using a neutron source in a logging tool for obtaining a characteristic of a formation surrounding a borehole is well known, particularly for measuring a formation porosity.

Certain techniques involve the use of a chemical source such as AmBe to provide neutrons to irradiate the formation such that scattered neutrons returning to the borehole may be detected and the formation characteristic (porosity) inferred. The irradiating of the formation may also induce gamma-rays from a decay of excited atoms that may be detected by the gamma-ray detector.

The neutron source may be an electronic generator of neutrons, which allows to irradiate the formation with neutrons having a much higher energy (14 MeV) than an average energy of the neutrons generated by a traditionally used AmBe source (4 MeV). As a consequence, there is a significant increase in a number of nuclei in the formation, which are transmuted into radioactive elements.

In particular, oxygen nuclei may be converted into nitrogen nuclei; the radioactive nitrogen atoms decay quickly by beta decay to an excited state of oxygen, which in turn decays by emitting gamma-rays. A majority of the emitted gamma-rays have an energy around 6.1 MeV, which is much higher than gamma-ray energies from naturally occurring radioactive materials.

A gamma-ray detector may also count gamma-induced gamma-rays produced by a gamma-ray generator. The gamma-ray generator irradiates the formation with gamma-rays having a relatively low energy, e.g., 600 keV. The gamma-rays are scattered by electrons in the formation, losing energy at each scattering event. The scattered gamma-rays hence also have a relatively low energy, and may be detected at the gamma-ray detector to provide information about the formation surrounding the borehole.

Radioactive tracer gamma-rays may also be detected at a gamma-ray detector. A radioactive tracer is injected into the formation and/or the borehole and emits radioactive tracer gamma-rays. The radioactive tracer gamma-rays are detected and provide information about a possible behavior of fluids within the formation and/or behind a casing.

It is hence possible to detect within the borehole gamma-rays from a plurality of sources.

Figure 1:
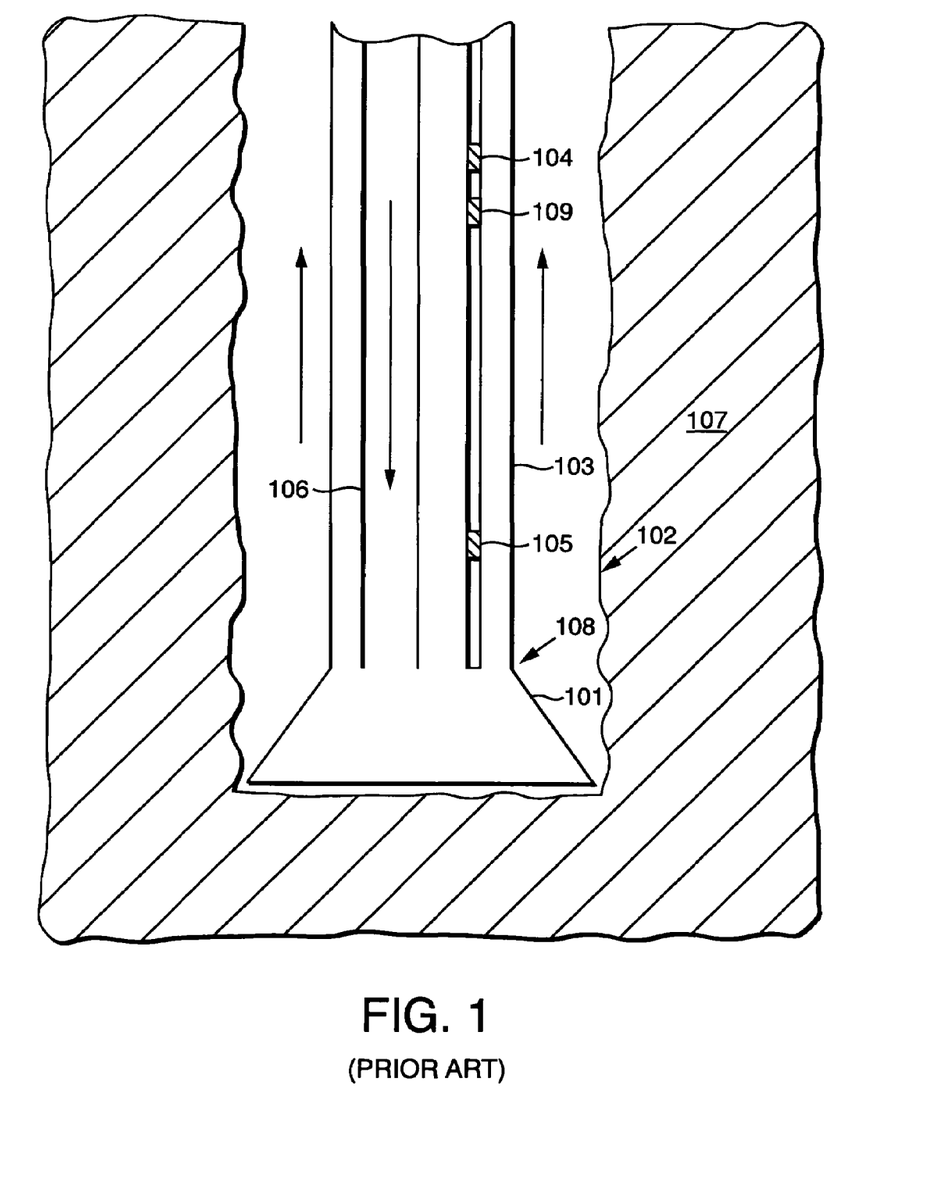
FIG. 1 contains a schematic of a logging while drilling system from Prior Art.

A gamma-ray logging may be performed during a drilling operation of the borehole, so as to provide information about the formation surrounding a drilled portion of the borehole as soon as possible. FIG. 1 shows a schematic of an example of a system for logging while drilling. A logging while drilling tool 108 comprises a drill bit 101 at an end of a drill string 103. The drill string 103 is used to drill a borehole 102. Logging tools (104, 105, 109) are disposed within the drill string 103, so as to allow a drilling mud to be carried through a mud channel 106. The drilling mud is pumped down to the drill bit 101, where it helps clear cuttings and bring them to the surface through an annulus between the drill string 103 and a formation 107.

One of the logging tools (104, 105, 109) may contain a neutron generator 104 that irradiates the formation 107 with high energy neutrons, so as to provide a mapping of the porosity of the formation 107. A gamma-ray detector 109 may be provided close to the neutron generator to measure gamma-rays induced by the generated neutrons.

Furthermore, a gamma-ray detector 105 may measure the natural gamma-ray activity of the formation 107. The gamma-ray detector 105 intended to measure the natural gamma-ray activity, may also detect gamma-rays produced by a gamma-ray inducing source, e.g. the neutron generator 104.

A correction method for a detector intended to detect gamma-induced gamma-rays is described in U.S. Pat. No. 5,459,314. A density source irradiates a formation with gamma-rays that interact with the formation and are detected after being scattered in a formation or a borehole. The detector intended to detect the scattered gamma-rays may also detect non-gamma induced gamma-rays which are not related to the gamma-rays emitted by the density source, i.e. gamma-rays that are generated by another logging tool source or natural gamma-rays from the formation. The correction method consists in identifying and removing the detected non-gamma induced gamma-rays. The identifying may be performed by detecting gamma-rays above a threshold energy level, and by determining a count of non-gamma induced gamma-rays. The count of non-gamma induced gamma-rays is then subtracted from a total gamma-ray count so as to obtain a count of gamma-rays from the density source.

A gain of the gamma-ray detector is defined as a ratio of an amplitude of gamma-ray signals and the energy of the gamma-rays. The gain of a gamma-rays spectroscopy system may vary as a function of an high voltage of a photomultiplier of the gamma-ray detector, the age of the photomultiplier, the temperature etc. It is hence necessary to stabilize the gain of the gamma-ray detectors.

A first method that is commonly used for stabilizing the gain consists in generating a peak of gamma-rays having a predetermined energy, i.e. a calibration peak having a predetermined position that is well defined. Since the predetermined energy of the calibration peak is known, it is relatively easy, once the calibration peak is detected at the detector, to adjust the gain so that a detected position of the calibration peak equals the predetermined position. Such a method may be implemented with a basic detector and three discriminators. The discriminators are used to detect gamma-rays within two energy windows. However, it is necessary, when counting relevant gamma-rays, to subtract gamma-rays of the calibration peak from a total of detected gamma-rays. Hence counting errors may be relatively high. For a detection of a natural gamma-ray activity where a counting rate may be relatively low, the counting of the relevant gamma-rays may not be precise enough if the first method is used.

A second method, described in U.S. Pat. No. 5,360,975, consists in recording a full gamma-ray spectrum and determining a best fit between a reference spectrum and the recorded spectrum. The gain of the best fit is used to regulate the gain of the gamma-ray detector. This method requires the detector to be in spectral mode to obtain the full gamma-ray spectrum.

European Patent EP0640848 describes a third method for use in a cased well. The third method aims at stabilizing the gain of a detector intended to be used for counting high-energy neutron-induced gamma-rays. A high-energy neutron generator irradiates the casing and the formation with high energy neutrons, which creates the high-energy neutron-induced gamma-rays and thermal-neutron-induced gamma-rays. Timing means are provided so as to obtain a measurement of both gamma-rays. As the casing contains iron atoms, an iron peak is always present in the measurement of the thermal-neutron-induced gamma-rays. The stabilizing of the gain of the detector is hence based on the iron peak. Once the gain is stabilized, it is considered that the measurement of the high-energy neutron-induced gamma-rays is correct.

SUMMARY OF INVENTION

In a first aspect the invention provides a method for stabilizing a gain of a gamma-ray detector for use in a downhole logging tool. The method is based on a processing of a backscatter peak of a full gamma spectrum.

In a first preferred embodiment, the method comprises determining a first rate, the first rate corresponding to gamma-rays having an energy within a first predetermined energy interval. A second rate is determined, the second rate corresponding to gamma-rays having an energy within a second predetermined energy interval. The first predetermined energy interval and the second predetermined energy interval straddle the backscatter peak.

In a second preferred embodiment, the gain is adjusted such that a ratio of the first rate and the second rate substantially equals a predetermined value.

In a third preferred embodiment, the gain is adjusted such that a difference of the first rate and the second rate multiplied by a predetermined positive coefficient substantially equals zero.

In a fourth preferred embodiment, a centroid position of a detected backscatter peak is measured. The gain is adjusted such that the measured centroid position equals a reference centroid position.

In a fifth preferred embodiment, the detector is intended to detect natural gamma-rays from a formation surrounding a borehole.

In a sixth preferred embodiment, a gamma-ray inducing source is located in a neighborhood of the gamma-ray detector.

In a seventh preferred embodiment, the detector is intended to detect neutron-induced gamma-ray.

In a second aspect, the invention provides a system for stabilizing a gain of a gamma-ray detector for use in a downhole logging tool. The system comprises the gamma-ray detector to detect gamma-ray. The system further comprises discriminating means allowing to compare the energy of the detected gamma-ray to at least three regulation thresholds. The three regulation thresholds are located in an energy neighborhood of a backscatter peak of a full gamma spectrum. The system further comprises adjusting means to adjust the gain of the gamma-ray detector.

In an eighth preferred embodiment, the discriminating means allow to determine a first rate and a second rate, the first rate and the second rate corresponding to gamma-rays having an energy respectively within a first predetermined energy interval and a second predetermined energy interval, the first predetermined energy interval and the second predetermined energy interval straddling the backscatter peak.

In an ninth preferred embodiment, the system further comprises calculating means to calculate a ratio of the first rate and the second rate and to compare the ratio to a predetermined value.

In a tenth preferred embodiment, the discriminating means allow to compare the energy of the detected gamma-ray to a relatively high number of regulation thresholds so as to obtain a complete spectrum. The system further comprises calculating means to calculate a centroid position of a detected backscatter peak of the complete spectrum and to compare the calculated centroid position to a reference centroid position.

In an eleventh preferred embodiment, the gamma-ray detector is located in a drilling tool. The gamma-ray detector is intended to detect natural gamma-rays from a formation surrounding a drilled borehole.

In a third aspect, the invention provides a method for evaluating a natural gamma-ray activity within a borehole. The method comprises determining an interval count rate. The interval count rate corresponds to gamma-rays having an energy within a predetermined correction interval. A correction count rate is calculated from the determined interval count rate and is used to evaluate the natural gamma-ray activity.

In a twelfth preferred embodiment, the predetermined correction interval is semi infinite above a predetermined correction threshold.

In a thirteenth preferred embodiment, a total gamma count rate is measured, the total gamma count rate corresponding to gamma-rays detected by the detector. The correction count rate is subtracted from the total gamma count rate to evaluate the natural gamma-ray activity.

In a fourteenth preferred embodiment, the correction count rate is proportional to the determined interval count rate.

In a fifteenth preferred embodiment, a gamma-ray inducing source is located downhole in a neighborhood of the system. The gamma-ray inducing source is an high energy neutron generator.

In a sixteenth preferred embodiment, the evaluating of the natural gamma-ray activity is performed during a drilling of the borehole.

In a seventeenth preferred embodiment, the neutron-induced gamma-rays are due to an activation of oxygen atoms located within a drilling mud.

In an eighteenth preferred embodiment, a gain of the gamma-ray detector is stabilized.

In a nineteenth preferred embodiment, a first rate is determined, the first rate corresponding to gamma-rays having an energy within a first predetermined energy interval. A second rate is determined, the second rate corresponding to gamma-rays having an energy within a second predetermined energy interval. The gain is adjusted to such that a value of a ratio of the first rate and the second rate substantially equals a predetermined value.

In a twentieth preferred embodiment, the first predetermined energy interval and the second predetermined energy interval straddle a backscatter peak of a full gamma spectrum.

In a twenty first preferred embodiment, calibration gamma-rays are generated, the energy of the calibration gamma-rays being substantially equal to a well defined energy value. The calibration gamma-rays are used to stabilize the gain of the gamma-ray detector.

In a fourth aspect, the invention provides a system for evaluating a natural gamma-ray activity within a borehole. The system comprises a detector located downhole to detect gamma-ray, at least one discriminator to allow to determine an interval count rate. The interval count rate corresponds to gamma-rays having an energy within a predetermined correction interval. The system further comprises processing means to calculate a correction count rate from the determined interval count rate. The correction count rate is used to evaluate the natural gamma-ray activity.

In a twenty second preferred embodiment, the predetermined correction interval is semi infinite above a predetermined correction threshold.

In a twenty third preferred embodiment, the at least one discriminator allows to determine a first rate and a second rate. The first rate and the second rate correspond to gamma-ray having an energy respectively within a first predetermined energy interval and a second predetermined energy interval. The system further comprises calculating means to calculate a ratio of the first rate and the second rate and to compare the ratio to a predetermined value. The system further comprises adjusting means to adjust a gain of the gamma-ray detector according to a result of the comparing.

In a twenty fourth preferred embodiment, a gamma-ray inducing source is located downhole near the system. The gamma-ray inducing source is an high energy neutron generator.

In a twenty fifth preferred embodiment, the detector is located in a drilling tool.

In a twenty sixth preferred embodiment, the detector detects neutron-induced gamma-rays, the neutron-induced gamma-rays being due to an activation of oxygen atoms located within a drilling mud by high energy neutrons.

In a twenty seventh preferred embodiment, the system further comprises a shield located at a rear side of a crystal of the gamma-ray detector to reduce the detecting of gamma-rays coming from the rear side.

In a twenty eighth preferred embodiment, the system further comprises a collar surrounding the crystal, the collar having a recess on a front side of the crystal to improve a transmission of gamma-rays coming from the front side.

Other aspects and advantages of the invention will be apparent from the following description and the appended claims.

DETAILED DESCRIPTION

Evaluating a natural gamma-ray activity may require a stabilization of a gamma-ray detector.

Such a stabilization may for example be performed with a detector in spectral mode, as described in the second method from prior art.

An other example for such a stabilization uses the third method from prior art. The detector is intended to be used for detecting neutron-generated gamma-rays in a cased well. The third method further requires timing means to separate high-energy neutrons-induced gamma-rays from thermal neutrons-induced gamma-rays.

There is a need for a method that is relatively simpler than the second or third methods from prior art, while not requiring a calibration source or a specific environment such as casing.

As described in an earlier paragraph, an electronic generator of neutrons may induce a high-energy gamma-ray activity by activating materials surrounding the electronic generator. When the electronic neutron generator is placed close to a mud channel on a logging while drilling tool, some oxygen atoms in the drilling mud may become activated. As the drilling mud is carried through the mud channel, the activated oxygen atoms remain radioactive over a certain distance. The distance depends on an half-life of the activated atoms of oxygen and on a drilling mud velocity.

It may happen that a flow of the drilling mud is sufficiently fast for a nearby located gamma-ray detector to detect a gamma-ray activity from the activated oxygen atoms. In this case, the detection of the activated oxygen atoms creates an unwanted background for a measurement of a natural gamma-ray activity of a formation.

Figure 2:
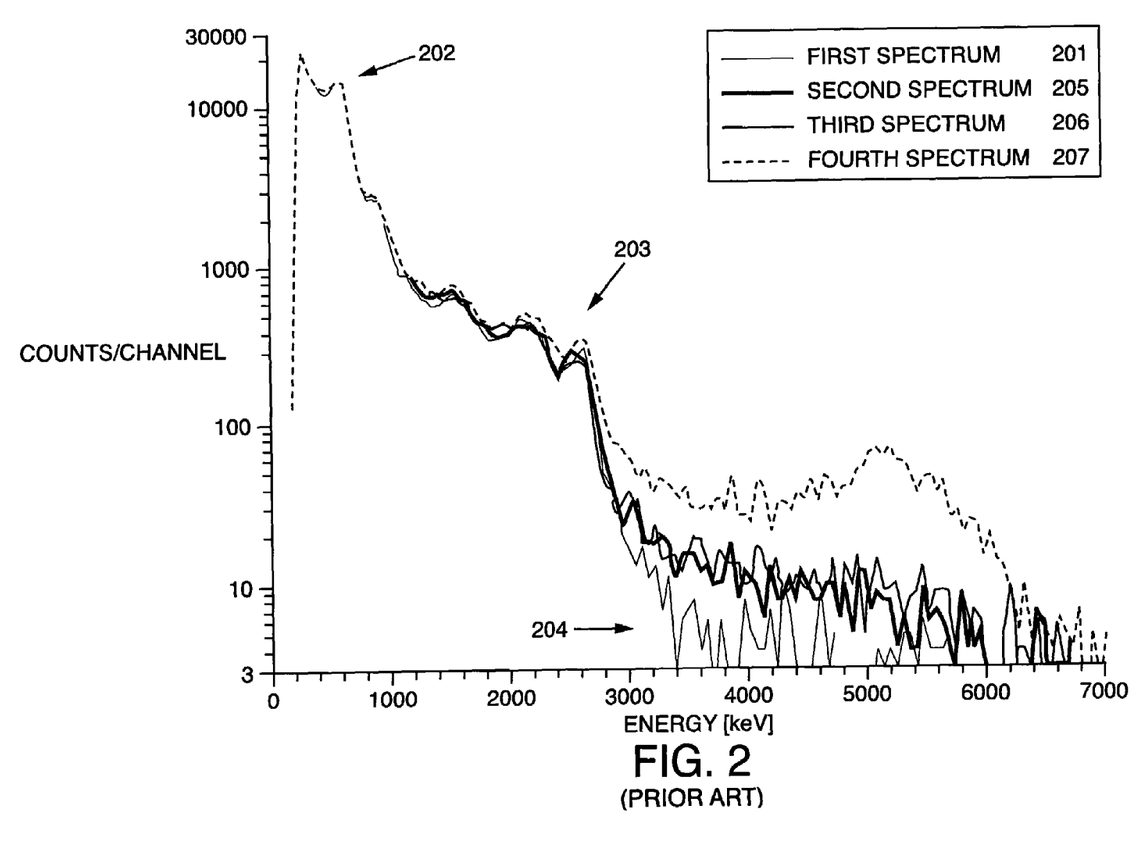
FIG. 2 shows gamma-ray spectra acquired with a gamma-ray detector positioned next to a mud channel of a logging while drilling tool.

FIG. 2 illustrates gamma-ray spectra acquired with a NaI(Tl) gamma-ray detector positioned next to a mud channel of a logging while drilling tool. A mud fluid passes close to a neutron generator, and some of its oxygen atoms may get activated by high energy neutrons. The activated fluid then travels toward the gamma-ray detector. The detector counts all gamma-rays that exceed a given energy threshold after amplification, i.e. both the gamma-rays from natural radioactivity and the gamma-rays from the activated oxygen atoms.

Four different spectra observed with the gamma-ray detector are represented. Counts per channel of the detector are plotted as a function of the energy in keV of the gamma-rays. A first spectrum 201 is recorded as the neutron generator is off. A first peak 202 at 662 keV and a second peak 203 at 2615 keV may be observed, corresponding respectively to a cesium source and to a weak thorium source. At higher energies, only a natural background 204 may be recorded.

A second spectrum 205 and a third spectrum 206 are recorded as the neutron generator is on. However, the mud fluid has a low flow velocity at the recording of the third spectrum 206, and no velocity at all at the recording of the second spectrum 205. In both cases, only a slight increase at energies higher than 3000 keV is observed as compared to the natural background 204 in spectrum 201. When the mud fluid has no flow, the activated atoms of oxygen do not pass the gamma-ray detector. At low flow rate, the activated oxygen atoms reach the gamma-ray detector after a duration that is much longer than a half-life of the activated atoms.

A fourth spectrum 207 is recorded when the neutron generator is on and the flow velocity of the drilling mud relatively high, i.e., the activated atoms of oxygen pass the gamma-ray detector after relatively short time compared to their half-life and generate a peak at about 5100 keV. A clear effect is thus observed. Such effect may induce relatively high errors when a basic detector, i.e. a detector that provides a raw counting of the gamma-rays independently of their energy, is used to detect the natural gamma-rays.

There is thus a need for a method that allows to evaluate the natural gamma-ray activity in a borehole in case a gamma-ray inducing source is located in a neighborhood of the detector.

Regulation of the Gain of the Detector

Figure 3:
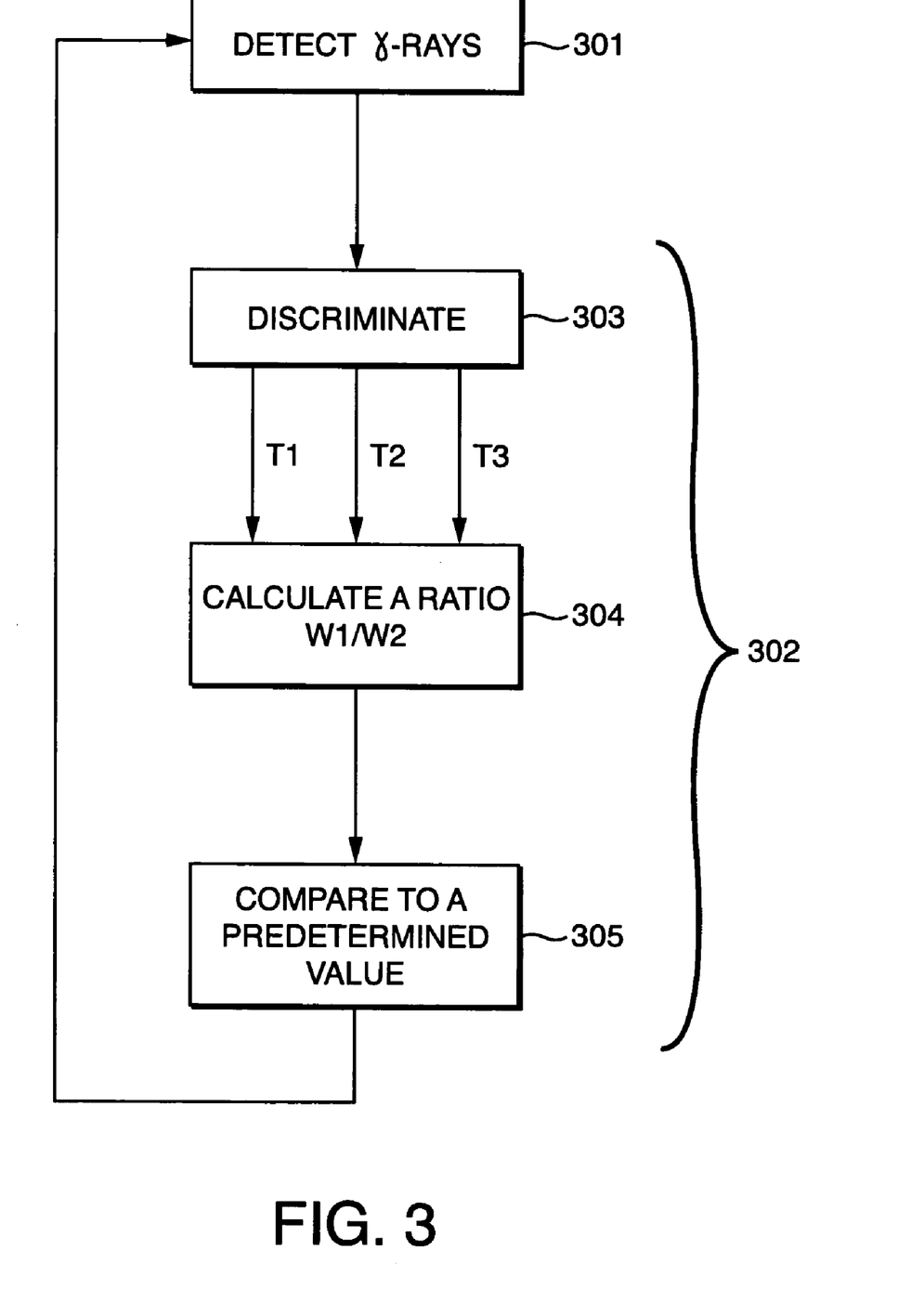
FIG. 3 contains a flowchart illustrating an example of the present invention.

FIG. 3 provides a flowchart illustrating an example of the present invention. A gamma-ray detector for use in a downhole logging tool is provided to detect gamma-rays (301). The gamma-ray detector has a gain that may vary with time, temperature, or with a high-voltage. According to the invention, the gain may be stabilized by applying a method based on a processing of a backscatter peak of a full gamma spectrum (302).

Figure 4:
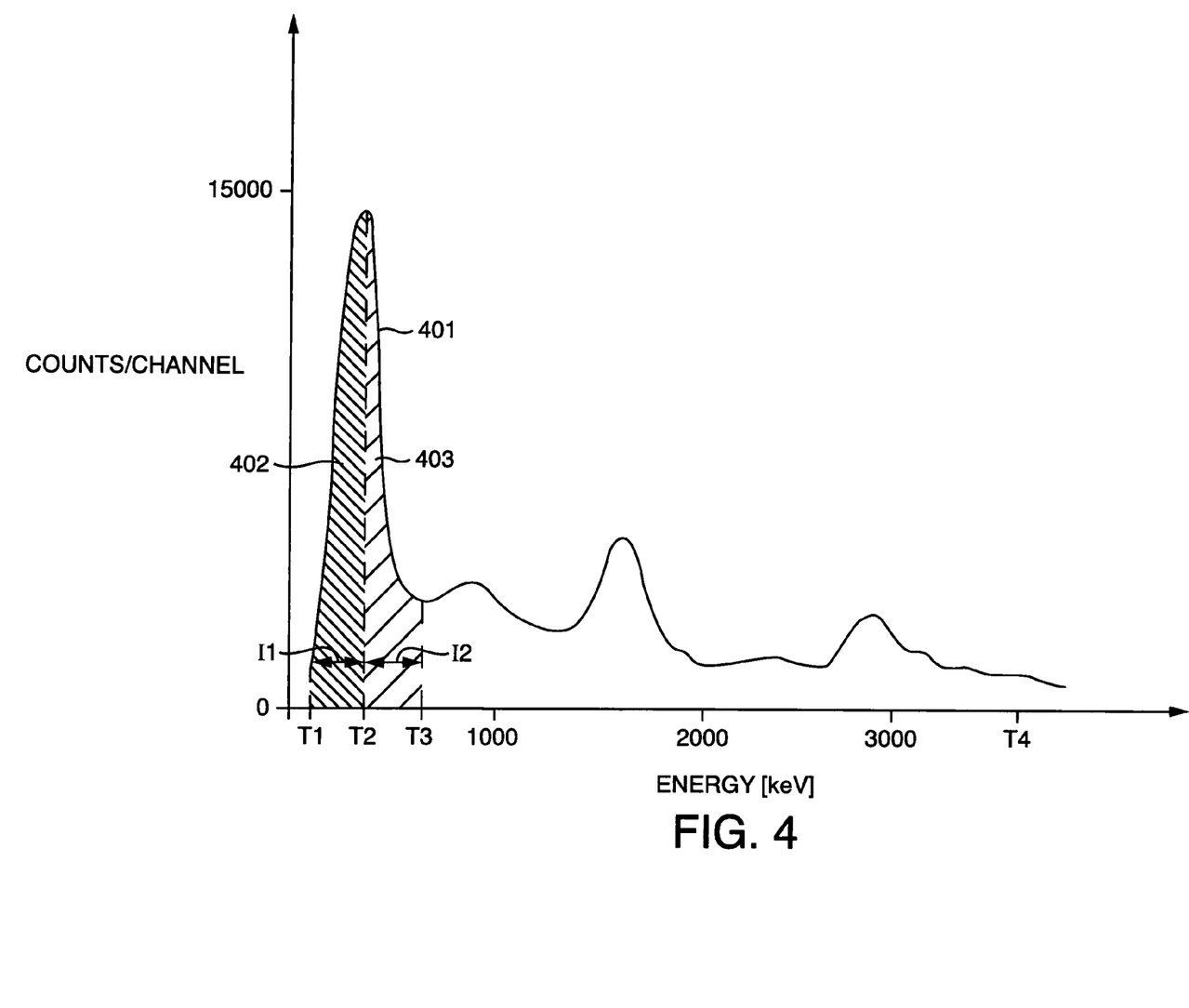
FIG. 4 shows an example of a full gamma-ray spectrum.

FIG. 4 illustrates an example of a full gamma-ray spectrum. The backscatter peak 401 is due to gamma-rays having lost energy by interacting with electrons. The energy of the backscatter peak 401 is hence relatively low and is relatively stable. The backscatter peak 401 is relatively independent of a density and an elemental composition of the formation. For this reason, it is possible to base the stabilizing of the detector on the stability of the backscatter peak.

Discriminating means, e.g. a discriminator, allow to compare the energy of the detected gamma-rays to at least three regulation thresholds. The three regulation thresholds are located in an energy neighborhood of the backscatter peak, i.e. within a same range of energies. Adjusting means to adjust the gain of the gamma-ray detector are also provided.

Referring again to FIG. 3, in a first preferred embodiment, the detected gamma-ray are discriminated (303) following three regulation thresholds T1, T2 and T3. A discriminator may allow to separate the detected gamma-rays according to a comparing with the regulation thresholds T1, T2 and T3. The first regulation threshold T1 and the second regulation threshold T2 define a first predetermined energy interval I1 (illustrated in FIG. 4). The second regulation threshold T2 and the third regulation threshold T3 define a second predetermined energy interval I2 (illustrated in FIG. 4).

The regulation thresholds T1, T2 and T3 have a value such that the first predetermined energy interval and the second predetermined energy interval straddle the backscatter peak 401 of a full gamma-ray spectrum. The values of the regulation thresholds may for example be 100 keV, 200 keV and 300 keV, whereas the backscatter peak has a maximum value for an energy substantially equal to 200 keV.

A first rate W1 and a second rate W2 (not represented in FIG. 3 or FIG. 4) corresponding to the detected gamma-rays having their energy respectively within the first predetermined energy interval I1 and the second predetermined energy interval I2 are determined. A ratio of the first rate W1 and the second rate W2 is calculated (304). The ratio is then compared (305) to a predetermined value.

According to a result of the comparing, adjusting means may adjust the gain of the gamma-ray detector so that the ratio substantially equals a predetermined value. The predetermined value may be equal to unity, or to another value due to a non-symmetric shape of the backscatter peak and/or to the fact that the first energy interval I1 and the second energy interval I2 may not have equal widths.

Alternatively, a difference of the first rate W1 and the second rate W2 multiplied by a predetermined positive coefficient c may be calculated. The gain may be adjusted such that the difference $W1-cW2$ substantially equals zero.

Typically, the gain of the gamma-rays detector is modified by adjusting a voltage HV applied to a photomultiplier tube of the detector.

The gamma-ray detector is stabilized using a regulating loop. The regulating loop allows to stabilize the gain of the detector without providing a calibration source, and without recording a full gamma-ray spectrum as in prior art. The inventive method, as based on a processing of a backscatter peak does not require timing means to isolate an iron peak.

The gain is adjusted such that the ratio of the first rate W1 and the second rate W2 substantially equals a predetermined value, i.e. gamma-rays corresponding to the backscatter peak 401 (referring to FIG. 4) have a detected energy centered around the second regulation threshold T2. Once the gain is regulated, the ratio of the areas of hashed surfaces 402 and 403 (referring to FIG. 4) is substantially equal to the predetermined value.

Figure 5:
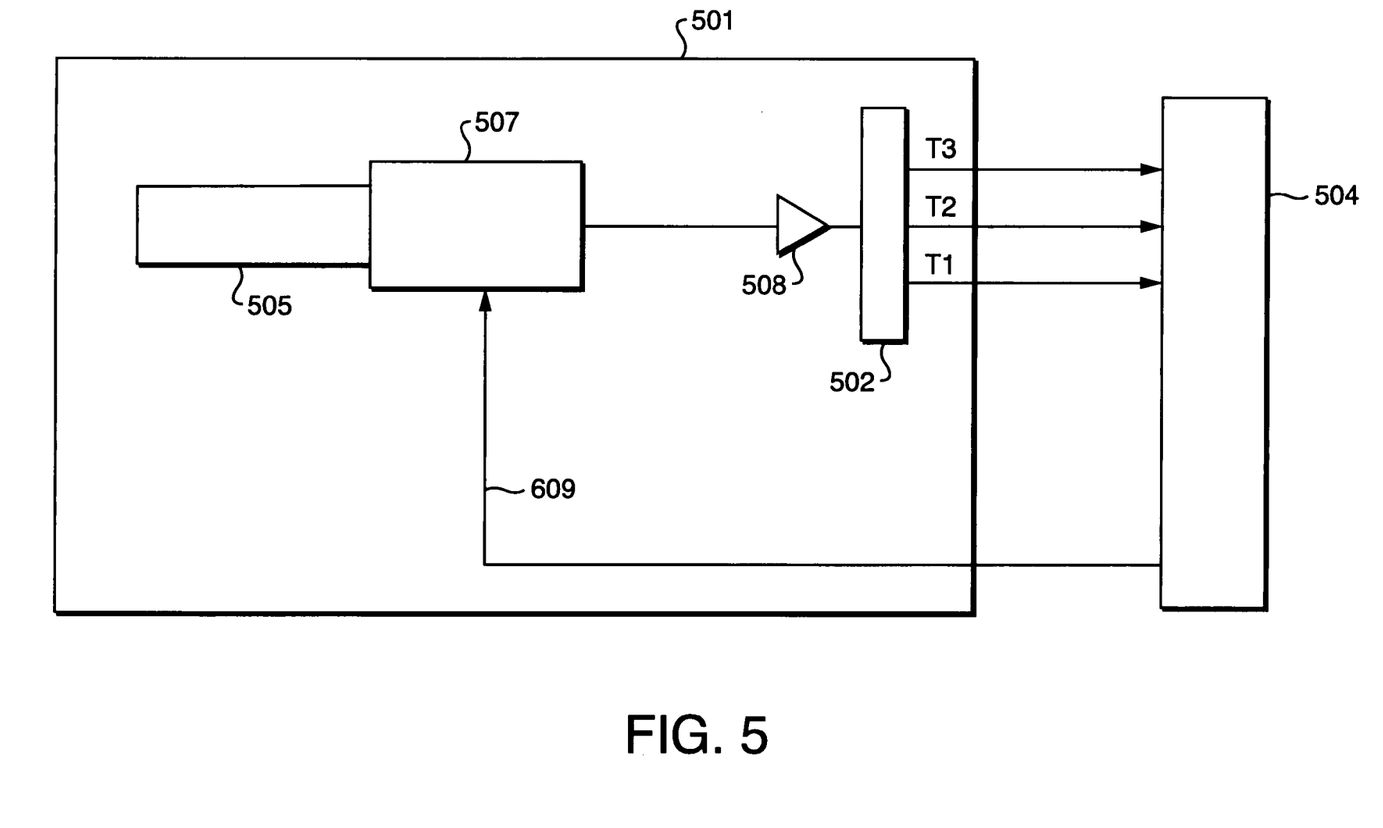
FIG. 5 contains an illustration of a system according to a second preferred embodiment of the present invention.

FIG. 5 illustrates an example of a system according to the first preferred embodiment of the present invention. A gamma-ray detector 501 comprises a crystal 505, a photomultiplier 507 and an amplifier 508. A discriminator 502 allows to compare the energy of detected gamma-rays to three regulation thresholds T1, T2 and T3. The regulation thresholds are located in a neighborhood of the backscatter peak of the full gamma-ray spectrum.

A first rate corresponding to gamma-rays having an energy between the first regulation threshold T1 and the second regulation threshold T2 may be determined by calculating means. Similarly, a second rate corresponding to gamma-rays having an energy between the second regulation threshold T2 and the third regulation threshold T3 may be determined by the calculating means. The calculating means may also compare the first rate to the second rate. The calculating means may be a relatively basic microprocessor 504. The microprocessor 504 may be associated to analog to digital converters (not represented).

Adjusting means, e.g. a high-voltage wire or a high-voltage control wire 609 associated with a digital to analog converter (not represented) adjusts the gain of the photomultiplier according to a result of the comparing.

In a second preferred embodiment, the gamma-ray detector may be in spectral mode, and hence, the method for stabilizing the detector may consist in measuring a centroid position of a detected backscatter peak. The measured centroid position may then be compared to a reference centroid position. According to a result of the comparing, the gain of the energy sensitive detector may be modified, e.g. by adjusting the photomultiplier high-voltage.

Figure 6:
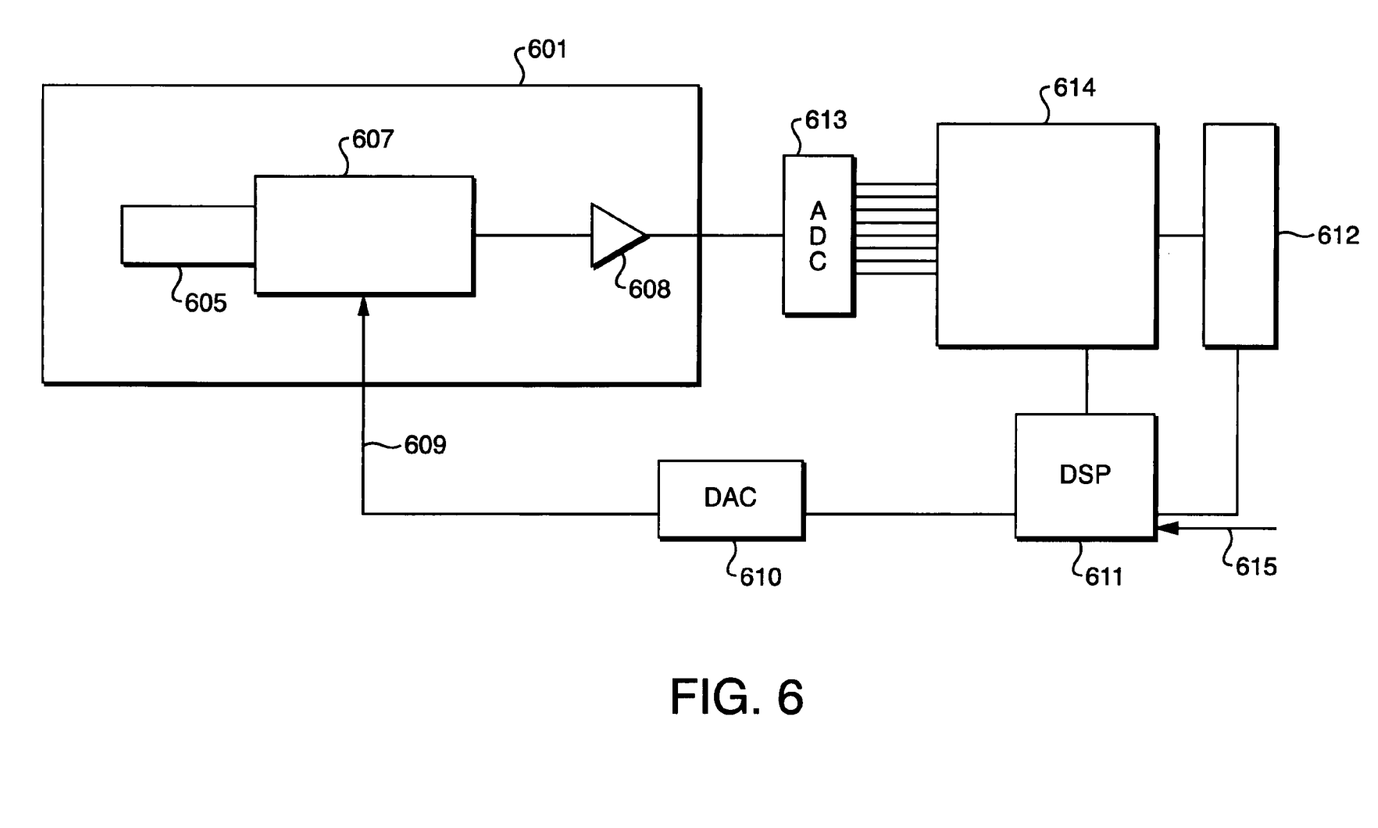
FIG. 6 contains an illustration of a system according to a third preferred embodiment of the present invention.

FIG. 6 illustrates an example of a system according to the second preferred embodiment. A gamma-ray detector 601 comprises a crystal 605, a photomultiplier 607 and an amplifier 608. An output signal at an output of the amplifier 608 is digitized with an Analog to Digital Converter 613 (ADC). Discriminating means, e.g. a digital integrator 614 associated to a memory 612, allow to compare the energy of the detected gamma-rays to a relatively high number n of regulation thresholds.

Typically, the number n of thresholds may be greater than ten, with at least two thresholds located in a neighborhood of a backscatter peak of a full gamma spectrum. The memory 612 allows to store a complete spectrum, the complete spectrum being sampled with a number of channels that corresponds to the number n of thresholds. A plurality of channels (1, ..., i, ... n-1) may be defined, each channel corresponding to an energy interval between two successive thresholds. For each channel, a number of counts $N_i$ may be stored in the memory 612.

Calculating means, e.g. a Digital Signal Processor 611 (DSP), may calculate a centroid position $C_{en}$ of a detected backscatter peak of the complete spectrum. For example, the centroid position $C_{en}$ may be determined as follows:

$$C_{en} = \frac{\sum_{i=C1}^{C2} i * N_i}{\sum_{i=C1}^{C2} N_i},$$

wherein C1 and C2 respectively denote a lower limit and an upper limit of the backscatter peak.

Other example of algorithms for determining the centroid position may easily be implemented within the DSP 611 by a person skilled in the art.

The DSP 611 compares the calculated centroid position $C_{en}$ to a reference centroid position. The gain of the photomultiplier is adjusted according to a result of the comparing. Adjusting means, e.g. a Digital to Analog Converter 610 (DAC) associated to a high-voltage or a high-voltage control wire 609, adjust the gain so as to provide a measurement of the centroid position of the backscatter peak that substantially equals the reference centroid position. The gamma-ray detector 601 is then stabilized.

The system may further comprise a bus, e.g. a CAN bus 615, to send data or to receive commands.

The second preferred embodiment may provide a more accurate regulation of the gain of the gamma-ray detector than the first preferred embodiment. However, it requires more complex discriminating means and calculating means.

The gamma-ray detector may be any detector for use in a downhole logging installation that allows to detect gamma-rays, e.g. a gamma-ray detector intended to detect natural gamma-rays from a formation surrounding a borehole. The gamma-ray detector may be located on a drilling tool, a wireline tool or a slickline logging tool. The gamma-ray detector may also be intended to detect neutron-induced gamma-rays, gamma-ray induced gamma-rays, or gamma-rays from a radioactive tracer etc.

Correction of the Detector Response

Figure 7:
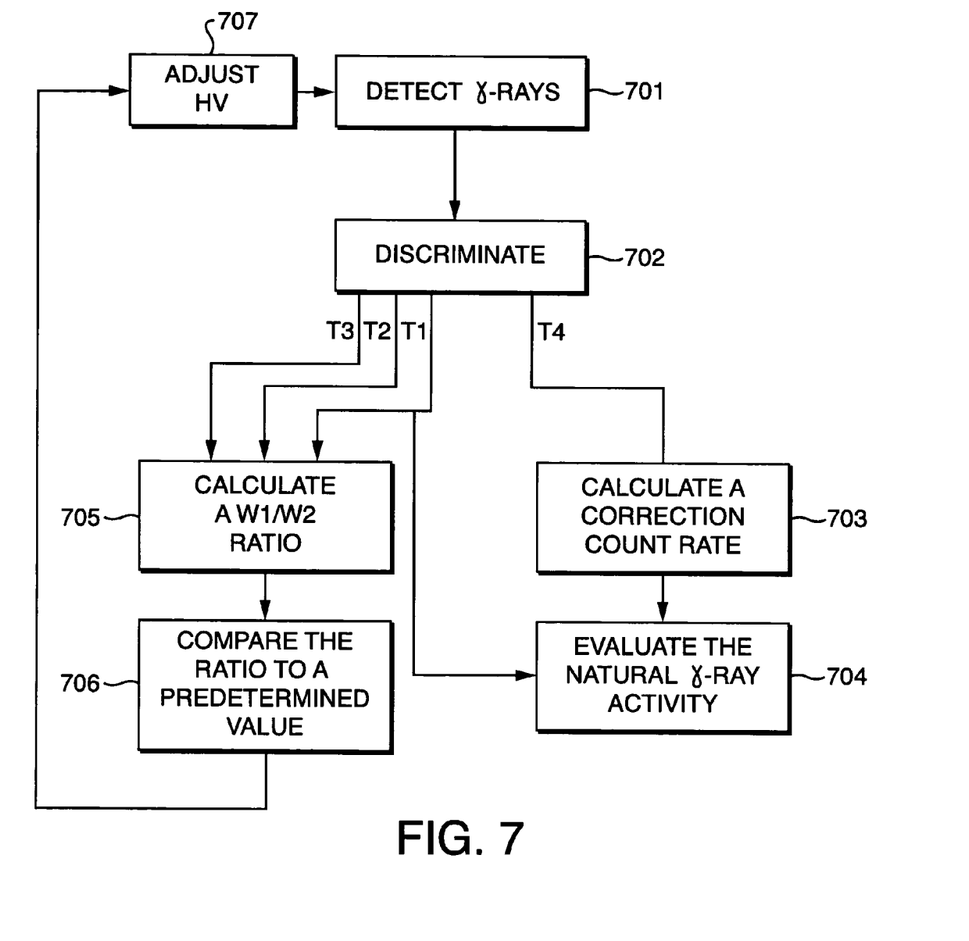
FIG. 7 contains a flowchart illustrating an example method according to the present invention.

FIG. 7 shows a flowchart illustrating an example method according to the present invention to evaluate a natural gamma-ray activity within a borehole. A gamma-ray detector detects (701) gamma-rays. A correction interval is defined and an interval count rate corresponding to gamma-rays having an energy within the correction interval, is determined. The correction interval may be semi-infinite above a correction threshold T4; in this case, a discriminator may be provided (702). A correction count rate is calculated (703) from the determined interval count rate and is used to evaluate (704) the natural gamma-ray activity.

The example method according to the invention allows to evaluate the natural gamma-ray activity, in particularly in a case in which a gamma-ray inducing source is located in a neighborhood of the gamma-ray detector. Typically, the gamma-ray inducing source is a high energy neutron generator. However, the gamma-ray inducing source may also be a radioactive tracer that is injected into a formation surrounding the borehole, or a gamma-ray source, or any other source that may induce gamma-rays.

The method according to the invention may be applied to a logging while drilling tool, the logging while drilling tool comprising a mud channel through which drilling mud is carried to a drill bit. The drilling mud may comprise oxygen atoms that may be activated and converted to nitrogen nuclei by the high energy neutrons; the radioactive nitrogen atoms decay and emit neutron-induced gamma-rays. Depending on a velocity of the drilling mud, the gamma-ray detector intended to detect natural gamma-rays may also detect the neutron-induced gamma-rays.

A possible value of the correction threshold T4 may be 3500 keV. As illustrated in the diagram of FIG. 2, most of the gamma-rays that are detected above 3500 keV are neutrons-induced gamma-rays.

Such a correction of a detector response may be preferably performed with a stabilized detector, i.e. a detector having a stable gain. It is indeed well known that the gain may vary with an high voltage applied to a photomultiplier tube, temperature, or time.

The stabilizing may be performed with various methods. At least one discriminator may be used to allow to determine a first rate W1 and a second rate W2, the first rate W1 and the second rate W2 corresponding to gamma-rays having an energy respectively within a first predetermined energy interval and a second predetermined energy interval. The at least one discriminator may separate the detected gamma-rays according to a comparing with three regulation thresholds T1, T2 and T3. The regulation thresholds T1, T2 and T3 define the first energy interval and the second energy interval. The regulation thresholds T1, T2 and T3 may be located in an energy neighborhood of a backscatter peak of a full gamma-ray spectrum, i.e. a peak that is relatively stable. The stabilizing method is based on the a stability of the backscatter peak.

The regulation thresholds allow to stabilize the gain of the detector. It is possible to calculate (705) a ratio of the first rate W1 and the second rate W2. The ratio is compared (706) to a predetermined value, and according to a result of the comparing, the gain of the detector is modified, typically by adjusting (707) the high voltage applied to the photomultiplier tube.

Any other method, whether based on the processing of the backscatter peak or not, may be applied to stabilize the gain of the detector.

Figure 8:
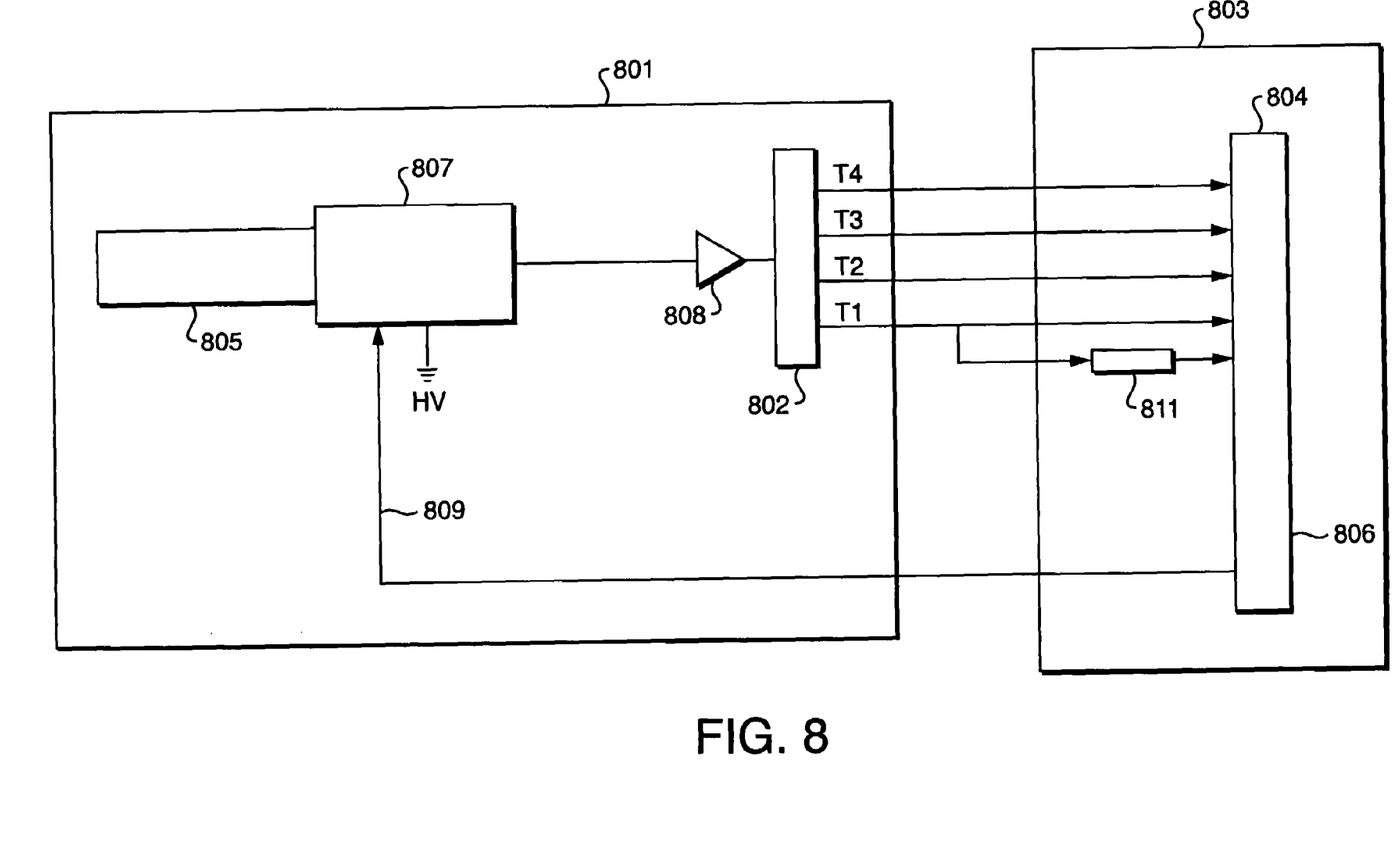
FIG. 8 contains an illustration of a system according to a further example embodiment of the present invention.

FIG. 8 schematically illustrates a further example embodiment of a system according to the invention. A gamma-ray detector 801 is located within a borehole. The gamma-ray detector may be associated to a discriminator 802 to allow to determine an interval count rate, the interval count rate corresponding to gamma-rays having an energy within a predetermined correction interval. The correction interval may be semi-infinite above a predetermined correction threshold T4, i.e. the determined interval count rate corresponds to gamma-rays having an energy that is above the predetermined correction threshold T4. The interval count rate is transmitted to a gamma acquisition unit 803.

Processing means 804, e.g. a microprocessor, calculate a correction count rate from the interval count rate. The correction count rate is used to evaluate the natural gamma-ray activity.

The detector 801 may comprise a crystal 805, a photo-multiplier 807, an amplifier 808 and the discriminator 802. The discriminator may also be a distinct device.

Adjusting means 809, e.g. a high-voltage wire or a high-voltage control wire, adjust a high-voltage HV of the photomultiplier 807. As the gain of the detector 801 depends on the high-voltage HV, the gain may be stabilized by adjusting the high-voltage HV. The adjusting of the high-voltage HV depends on a value of a ratio of a first rate and a second rate. The first rate and the second rate respectively corresponds to gamma-rays having an energy within a first predetermined energy interval and a second predetermined energy interval. The first predetermined energy interval and the second predetermined energy interval may be defined by three regulation thresholds T1, T2, T3.

Count rates above each thresholds T1, T2, T3 and T4 are transmitted to the gamma acquisition unit 803. Calculating means 806 calculate a ratio of the first rate and the second rate and compare the ratio to a predetermined value. The adjusting means 809 adjust the gain according to a result of the comparing at the calculating means 806. The processing means 804 compute a correction count rate to be used for evaluating the natural gamma-ray activity. In the further example embodiment, the calculating means 806 and the processing means 804 are both implemented within a single chip. A quasi-total gamma count rate corresponding to the gamma-rays having an energy higher than the first determined regulation threshold T1 is determined. The evaluating of the natural gamma-ray activity is performed by subtracting the correction count rate from the quasi-total gamma count rate.

In an alternative embodiment (not represented), the calculating means and the processing means are distinct devices. The correction count rate may be transmitted to a third unit via a correction bus. The quasi-total gamma count rate may also be transmitted to the third unit. The evaluating of the natural gamma-ray activity is performed at the third unit by subtracting the correction count rate from the quasi-total gamma count rate.

In another alternative embodiment (not represented), the processing means may communicate with the calculating means and the evaluating of the natural gamma-ray activity may be performed at the processing means.

The system according to the invention may also comprise a one-shot generating device 811. When a photon is detected at the photomultiplier, a pulse is generated. The one-shot generating device 811 generates a dead time, e.g. 100 us, after each pulse. The one-shot generating device 811 hence allows to prevent possible artifact pulses after each pulse.

According to a yet an other preferred embodiment of the present invention (not represented), the system may also comprise a calibration source, i.e. a gamma-ray source that generates calibration gamma-rays. The energy of the calibration gamma-rays is substantially equal to a well defined energy value. A resulting calibration peak is used to regulate the gain of the detector, instead of the backscatter peak as in the previous described embodiments. The other preferred embodiment may provide a more accurate gain regulation. However, an added count rate from the calibration source may negatively affect the counting statistics.

Any other method for stabilizing the gain of the detector may be used. The method according to the further embodiment allows the use of a generic gamma-ray detector.

Figure 9:
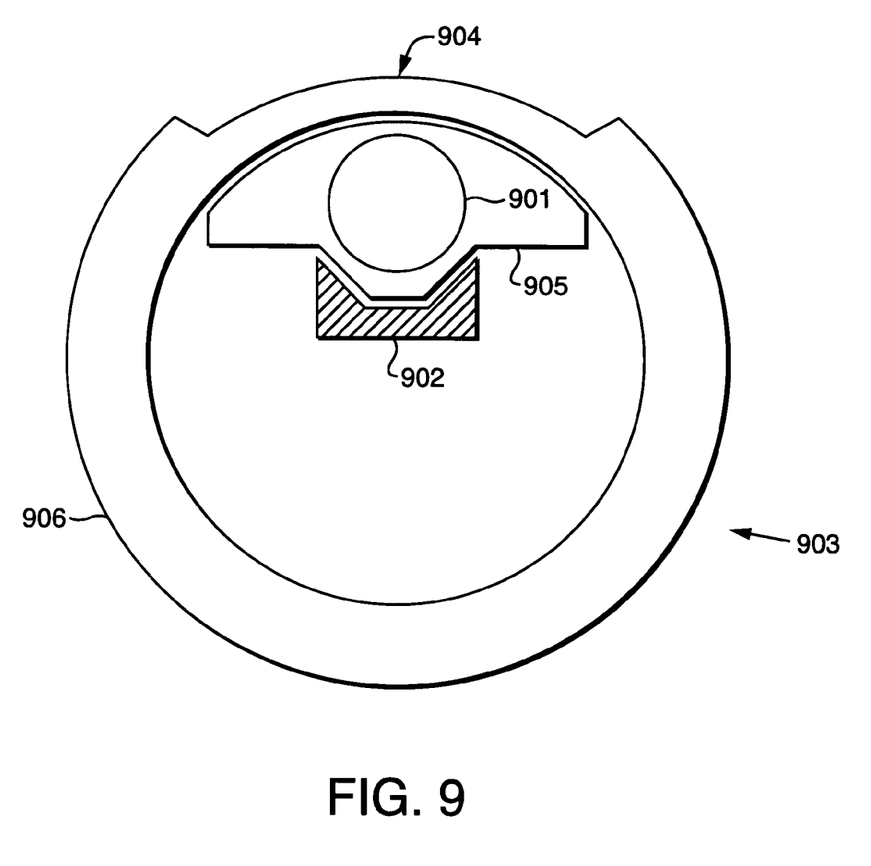
FIG. 9 contains a schematic of an example of a logging tool according to the present invention.

FIG. 9 illustrates an example cross section of a logging tool according to the present invention. The gamma-ray detector of the present invention comprises a crystal 901 that is located within a logging tool 903. The crystal 901 is supported by a detector carrier 905. In order to enhance an azimuthal focusing of the detecting, a shield 902 is provided at a rear side of the crystal 901. The shield may reduce a number of gamma-rays coming from the rear side.

Furthermore, a collar 906 of the logging tool 903 may comprise a recess 904 on a front side of the crystal. The recess allows to improve a transmission of gamma-rays coming from the front side and to increase the detecting of gamma-ray coming from the front side, which enhances an azimuthal sensitivity.

The shield 902 and the recess 904 run along a whole length of the crystal 901 in a longitudinal direction of the borehole.

Figure 10:
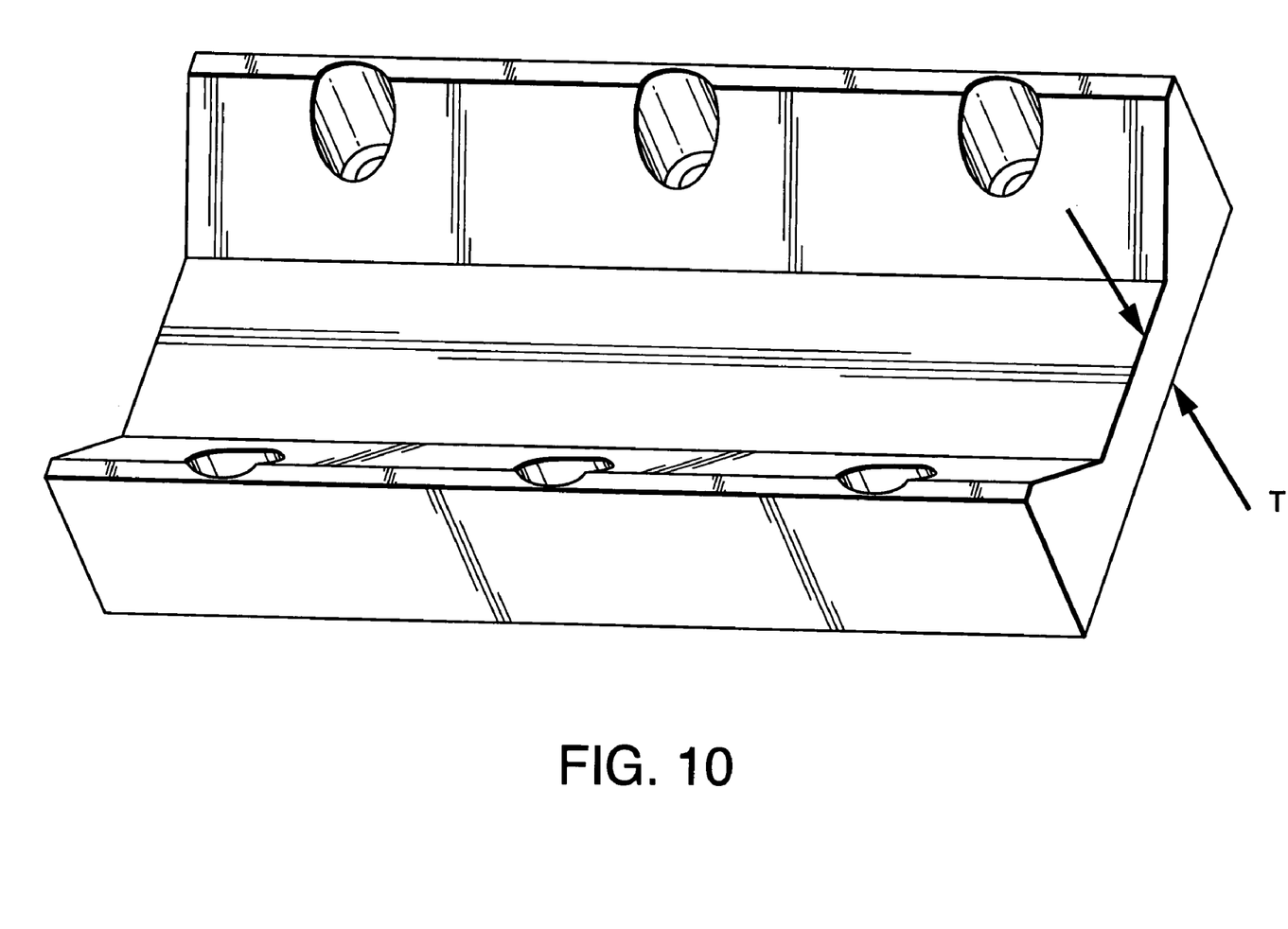
FIG. 10 contains a schematic of an example of a shield according to the present invention.

FIG. 10 illustrates an example of a shield according to the invention. The shield may block gamma-rays coming from the rear side. For this purpose, the shield may be made of an absorbing material, e.g. tungsten, or other high density material. The shield may have an adequate thickness T, e.g. 10 millimeters, to allow the blocking of the gamma-rays from the rear side. The shield also allows to attenuate neutron-induced gamma-rays or any other gamma-rays.

The shield and the recess allow measurements with an enhanced azimuthal focusing. The statistical precision of the gamma-ray detection is indeed closely related to a length and a diameter of the crystal. A large crystal allows to detect more gamma-rays. However, a large crystal leaves less room for back-shielding, thus reducing the azimuthal focusing.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A method for stabilizing a gain of a gamma-ray detector for use in a downhole logging tool, wherein the method comprises the steps of:
   processing a backscatter peak of a full gamma spectrum such that the backscatter peak constitutes a reference peak;
   determining a first rate, the first rate corresponding to gamma-rays having an energy within a first predetermined energy interval;
   determining a second rate, the second rate corresponding to gamma-rays having an energy within a second predetermined energy interval; and
   wherein the first predetermined energy interval and the second predetermined energy interval straddle the backscatter peak.

2. The method of claim 1, the method further comprising:
   adjusting the gain such that a ratio of the first rate and the second rate substantially equals a predetermined value.

3. The method of claim 1, the method further comprising adjusting the gain such that a difference of the first rate and the second rate multiplied by a predetermined positive coefficient substantially equals zero.

4. The method of claim 1, the method further comprising:
   measuring a centroid position of a detected backscatter peak;
   adjusting the gain such that the measured centroid position equals a reference centroid position.

5. The method according to claim 1, wherein the detector is intended to detect natural gamma-rays from a formation surrounding a borehole.

6. The method according to claim 5, wherein a gamma-ray inducing source is located in a neighborhood of the gamma-ray detector.

7. The method according to claim 1, wherein the detector is intended to detect neutron-induced gamma-rays.

8. A system for stabilizing a gain of a gamma-ray detector for use in a downhole logging tool, the system comprising:
the gamma-ray detector to detect gamma-rays;
discriminating means allowing to compare the energy of the detected gamma-rays to at least three regulation thresholds, the three regulation thresholds being located in an energy neighborhood of a backscatter peak of a full gamma spectrum, the backscatter peak constituting a reference peak, the discriminating means determining a first rate and a second rate, the first rate and the second rate corresponding to gamma-rays having an energy respectively within a first predetermined energy interval and a second predetermined energy interval, the first predetermined energy interval and the second predetermined energy interval straddling the backscatter peak; and
adjusting means to adjust the gain of the gamma-ray detector.

9. The system of claim 8, further comprising:
calculating means to calculate a ratio of the first rate and the second rate and to compare the ratio to a predetermined value.

10. The system of claim 8, wherein:
the discriminating means allowing to compare the energy of the detected gamma-rays to a relatively high number of regulation thresholds so as to obtain a complete spectrum;
the system further comprises calculating means to calculate a centroid position of a detected backscatter peak of the complete spectrum and to compare the calculated centroid position to a reference centroid position.

11. The system of claim 8, wherein
the gamma-ray detector is located in a drilling tool;
the gamma-ray detector is intended to detect natural gamma-rays from a formation surrounding a drilled borehole.

12. A method for evaluating a natural gamma-ray activity within a borehole, the method comprising:
stabilizing a gain of a gamma-ray detector by processing a backscatter peak of a full gamma spectrum such that the backscatter peak constitutes a reference peak by:
determining a first rate, the first rate corresponding to gamma-rays having an energy within a first predetermined energy interval, determining a second rate, the second rate corresponding to gamma-rays having an energy within a second predetermined energy interval, the first predetermined energy interval and the second predetermined energy interval straddling the backscatter peak; and
adjusting the gain to such that a value of a ratio of the first rate and the second rate substantially equals a predetermined value;
determining an interval count rate, the interval count rate corresponding to gamma-rays having an energy within a predetermined correction interval;
calculating a correction count rate from the determined interval count rate; and
using the correction count rate to evaluate the natural gamma-ray activity.

13. The method according to claim 12, wherein the predetermined correction interval is semi infinite above a predetermined correction threshold.

14. The method according to claim 13, further comprising:
measuring a total gamma count rate, the total gamma count rate corresponding to gamma-rays detected by the gamma-ray detector;
subtracting the correction count rate from the total gamma count rate to evaluate the natural gamma-ray activity.

15. The method according to claim 14, wherein the correction count rate is proportional to the determined interval count rate.

16. The method according to claim 12, wherein
a gamma-ray inducing source is located downhole in a neighborhood of the system; and
the gamma-ray inducing source is an high energy neutron generator.

17. The method according to claim 16, wherein the evaluating of the natural gamma-ray activity is performed during a drilling of the borehole.

18. The method according to claim 17, wherein the neutron-induced gamma-rays are due to an activation of oxygen atoms located within a drilling mud.

19. A system for evaluating a natural gamma-ray activity within a borehole, the system comprising:
a gamma-ray detector located downhole to detect gamma-rays;
at least one discriminator to allow to determine an interval count rate, the interval count rate corresponding to gamma-rays having an energy within a predetermined correction interval, the at least one discriminator allowing to determine and compare a first rate and a second rate, the first rate and the second rate corresponding to gamma-rays having an energy respectively within a first predetermined energy interval and a second predetermined energy interval, the first predetermined energy interval and the second predetermined energy interval straddling a backscatter peak of a full gamma spectrum, the backscatter peak constituting a reference peak;
adjusting means to adjust a gain of the gamma-ray detector according to a result of the comparing;
calculating means to calculate a ratio of the first rate and the second rate and to compare the ratio to a predetermined value; and
processing means to calculate a correction count rate from the determined interval count rate, the correction count rate being used to evaluate the natural gamma-ray activity.

20. The system according to claim 19, wherein the predetermined correction interval is semi infinite above a predetermined correction threshold.

21. The system according to claim 19, wherein
a gamma-ray inducing source is located downhole near the system;
the gamma-ray inducing source is an high energy neutron generator.

22. The system according to claim 21, wherein the detector is located in a drilling tool.

23. The system according to claim 22, wherein the detector detects neutron-induced gamma-rays, the neutron-induced gamma-rays being due to an activation of oxygen atoms located in a drilling mud by high energy neutrons.

24. The system according to claims 19, further comprising:
a shield located at a rear side of a crystal of the gamma-ray detector to reduce the detecting of gamma-rays coming from the rear side.

25. The system according to claims 24, further comprising a collar surrounding the crystal, the collar having a recess on a front side of the crystal to improve a transmission of gamma-rays coming from the front side.

* * * * *